US008352644B2

(12) United States Patent
Malamant et al.

(10) Patent No.: US 8,352,644 B2
(45) Date of Patent: Jan. 8, 2013

(54) APPARATUS AND METHODS FOR USB CONNECTION IN A MULTI-PROCESSOR DEVICE (75) Inventors: Igor Malamant, San Diego, CA (US); Raghavendar Bhavansikar, Erie, CO (US); Sergio Kolor, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/950,483

(22) Filed: Nov. 19, 2010

(65) Prior Publication Data

US 2011/0145445 A1 Jun. 16, 2011

Related U.S. Application Data (60) Provisional application No. 61/263,782, filed on Nov. 23, 2009.

(51) Int. Cl.
*G06F 3/00* (2006.01)
(52) U.S. Cl. ................... 710/20; 710/6; 710/16
(58) Field of Classification Search ........... 710/16, 710/36, 38, 6, 20
See application file for complete search history.

(56) References Cited

U.S. PATENT DOCUMENTS

| | | | | |
|---|---|---|---|---|
| 6,600,739 | B1 * | 7/2003 | Evans et al. | 370/362 |
| 6,959,350 | B1 * | 10/2005 | Luke et al. | 710/104 |
| 2007/0088967 | A1 * | 4/2007 | Fu et al. | 713/340 |
| 2008/0272741 | A1 * | 11/2008 | Kanamori | 320/137 |
| 2008/0303486 | A1 | 12/2008 | Kao et al. | |
| 2009/0177780 | A1 | 7/2009 | Chen | |
| 2010/0180006 | A1 * | 7/2010 | Nourbakhsh et al. | 709/213 |
| 2011/0013624 | A1 * | 1/2011 | Lerzer et al. | 370/360 |

FOREIGN PATENT DOCUMENTS

WO   WO 2008120044   10/2008

OTHER PUBLICATIONS

International Search Report and Written Opinion—PCT/US2010/057743, ISA/EPO—Apr. 20, 2011.

* cited by examiner

*Primary Examiner* — Chun-Kuan Lee
*Assistant Examiner* — Farley Abad
(74) *Attorney, Agent, or Firm* — Stanton Braden (57) ABSTRACT Disclosed are apparatus and methods for use in a USB device with multiple processors, allowing shared USB connectivity in the device. The disclosed apparatus and methods allow selective coupling of a first processor to a USB port of the device or to a USB hub operable to route a plurality of USB connections including connection of a second processor to the port. Providing selective coupling of the processors to the port by switching the coupling of the first processor and selectively powering the hub on and off for selective coupling of the second processor, thereby selectively enabling tethered networking such as wireless networking, affords increased power savings in the device. Furthermore, default coupling of the first processor to the port allows for USB battery charger detection, or direct connectivity to USB peripheral devices, as well as providing programming capability via the default coupling of the port to the first processor.

39 Claims, 7 Drawing Sheets

APPARATUS AND METHODS FOR USB CONNECTION IN A MULTI-PROCESSOR DEVICE

CLAIM OF PRIORITY UNDER 35 U.S.C. §119

The present Application for Patent claims priority to Provisional Application No. 61/263,782 entitled "METHODS AND APPARATUS FOR USB CONNECTION SHARING IN A MULTI-PROCESSOR DEVICE" filed Nov. 23, 2009, and assigned to the assignee hereof and hereby expressly incorporated by reference herein.

BACKGROUND

1. Field

The present disclosure relates generally to methods and apparatus for Universal Serial Bus (USB) connection sharing in a multi-processor or multi-chip device, and more specifically to selectively sharing a USB connection in a multi-processor or multi-chip device based on whether or not concurrent tethered high-speed network access technology networking and USB data transfer is occurring in the device.

2. Background

Integrating a standalone modem chip, such as an LTE modem chip, with an Application Processor in a communication device Multi-processor USB device such as a smart phone introduces a problem of sharing a USB connection to a personal computer (PC) or a peripheral device. A challenging scenario is when the phone is connected to a PC or peripheral device over USB while also providing tethered networking (e.g., Long Term Evolution (LTE)) USB connectivity in parallel to transfer large multimedia files, as one example, between the PC and the phone on the same USB connector. Since technologies such as LTE or Wi-Fi, for example, enable very high data rates (up to 326.4 Mbit/s on the downlink and up to 86.5 Mbit/s on the uplink), it becomes challenging to route this data stream through the Application Processor.

It is noted that it is known to solve similar problems for lower speed networks by routing all IP traffic from the modem chip to the Application Processor and then forwarding it to the PC or peripheral device via USB, where the Application Processor is connected directly to the USB port or connector of a device. Such designs, however, do not scale well as network data rates go up, such as in LTE systems. In such a case, an Application Processor's performance is consequently limited or diminished especially when there are concurrency requirements for the Application Processor and the modem chip providing network connectivity (or even other chips in the device requiring USB connectivity to the USB port).

Other systems may share a single USB port for connection to the PC and switch the connection to either a modem processor or an application processor based on the desired use case. In one example, such designs may require that LTE tethered networking to the PC and multimedia content transfer to the phone are mutually exclusive. Accordingly, there is a need for improved USB connectivity in multi-processor or multi-chip devices where more than one processor or chip requires external USB communications, particularly for high data rate devices such as LTE devices.

SUMMARY

According to an aspect, a multi-processor universal serial bus (USB) device is disclosed. The device includes a first processor, such as an application processor, a USB hub operable to route a plurality of USB connections, and a second processor, such as a baseband processor, coupled to the USB hub. Additionally, the device includes at least a first switch coupled to a USB port of the device that is configured to selectively couple the USB port to one of the first processor or to the USB hub. This particular design providing selective connectivity of the first processor to the port directly, or through the hub affords the ability to power the hub on only when the second processor needs to be coupled to the USB port, thus increasing power savings in a multi-processor USB device.

According to another aspect, a method for communicatively coupling components in a multi-processor USB device is disclosed. The method includes selectively coupling a USB port of the device to a first processor during a first state. The method further includes selectively coupling the USB port to a USB hub coupled to the first processor and at least a second processor during a second state thereby enabling coupling of the second processor to the USB port through the USB hub.

According to still another aspect, an apparatus for communicatively coupling components in a multi-processor USB device is disclosed. The apparatus includes means for selectively coupling a USB port of the device to a first processor during a first state. Further, the apparatus includes means for selectively coupling the USB port to a USB hub coupled to the first processor and at least a second processor during a second state thereby enabling coupling of the second processor to the USB port through the USB hub.

According to yet one further aspect, a computer program product comprising computer-readable medium is disclosed. The medium includes code for causing a computer to control selective coupling of a USB port of a multi-processor USB device to a first processor in the device during a first state. The medium also includes code for causing a computer to control selective coupling of the USB port to a USB hub coupled to the first processor and at least a second processor during a second state thereby enabling coupling of the second processor to the USB port through the USB hub.

DETAILED DESCRIPTION

The presently disclosed methods and apparatus provide integration of a USB hub in a wireless device that will at least connect both a modem chip and an Application Processor (or chip containing the Application Processor) on its downstream facing ports and will connect to an external USB port or connector on the device on its upstream facing port. In addition, the disclosed methods and apparatus utilize one or more switches that can disable the USB hub and redirect USB traffic directly to the Application Processor or chip when tethered networking, such as LTE networking, is not required or needed. In this way, the present disclosure affords a scheme where the USB hub can be powered down to save power resources, provide USB charging for multiple types of USB chargers, and improve emergency programming and software upgrades effected via USB connections.

Furthermore, the presently disclosed apparatus and methods enable LTE or other high data rate modems to be integrated into Smart Phone or similarly designed wireless devices in such a way to enable LTE data connectivity to a PC or wireless device over USB in parallel to synchronizing multimedia content over the same USB connector on the phone. This solution can provide full data rates of LTE to the PC without affecting CPU or bus utilization of the main application processor, which can continue running CPU-intensive applications in parallel. This may include watching broadcast movies on the phone while downloading data over to the PC over the LTE network. Additionally, the use of analog switches in the present apparatus enables power-efficient operation. Furthermore, the present apparatus and methods address the issue of USB charging on such an integrated platform. Bypassing the USB hub enables detection of multiple USB charger types and allows higher charging currents (up to 1.5A) and, therefore, faster charging time.

The techniques described herein may be used for devices used in various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Ultra Mobile Bandwidth (UMB), Evolved UTRA (E-UTRA), IEEE 802.11, IEEE 802.16 (WiMax), IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for UMB, and UMB terminology is used in much of the description below. Although the present disclosure is described for use in LTE, Wi-Fi or WiMax devices, one skilled in the art will appreciated that the disclosed concepts apply to any other Multi-processor USB devices where two or more processors or chips may utilize an external USB connection.

Figure 1:
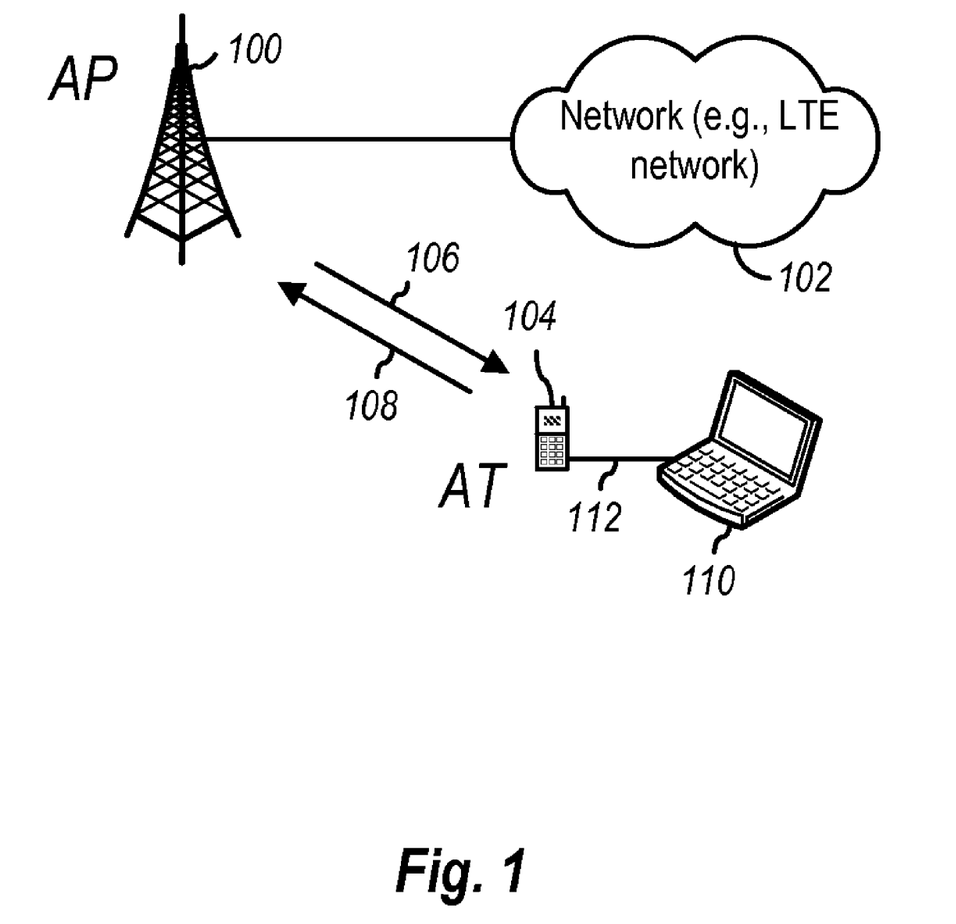
FIG. 1 illustrates an exemplary wireless communication configuration in which the present apparatus and methods may be utilized.

FIG. 1 illustrates an example of a multiple access wireless communication system in which the present methods and apparatus may be employed. An access point 100 (AP) (or eNodeB or base station) is connected to and is part of a particular network 102, such as an LTE network as one example. An access terminal 104 (AT) (or mobile device, wireless device, mobile phone, smart phone, or user equipment (UE)) is in communication with access point 100 over a downlink (DL) or forward link 106, and receives information from access terminal 104 over an uplink (UL) or reverse link 108.

The access terminal 104 may also be coupled with a peripheral device 110, such as a PC, via a tethered coupling 112 such as USB connection. As will be discussed herein, the present methods and apparatus effect selective USB coupling of at least a chip containing an Application processor and a modem chip for communicating with a network, such as 102 via a radio link (i.e., DL 106 and UL 108), to a host or peripheral device (e.g., 110).

It is noted that an access point may be a fixed station used for communicating with the terminals and may also be referred to as an access point, a Node B, or some other terminology. An access terminal may also be called an access terminal, user equipment (UE), a wireless communication device, terminal, access terminal, mobile phone, or some other terminology.

Figure 2:
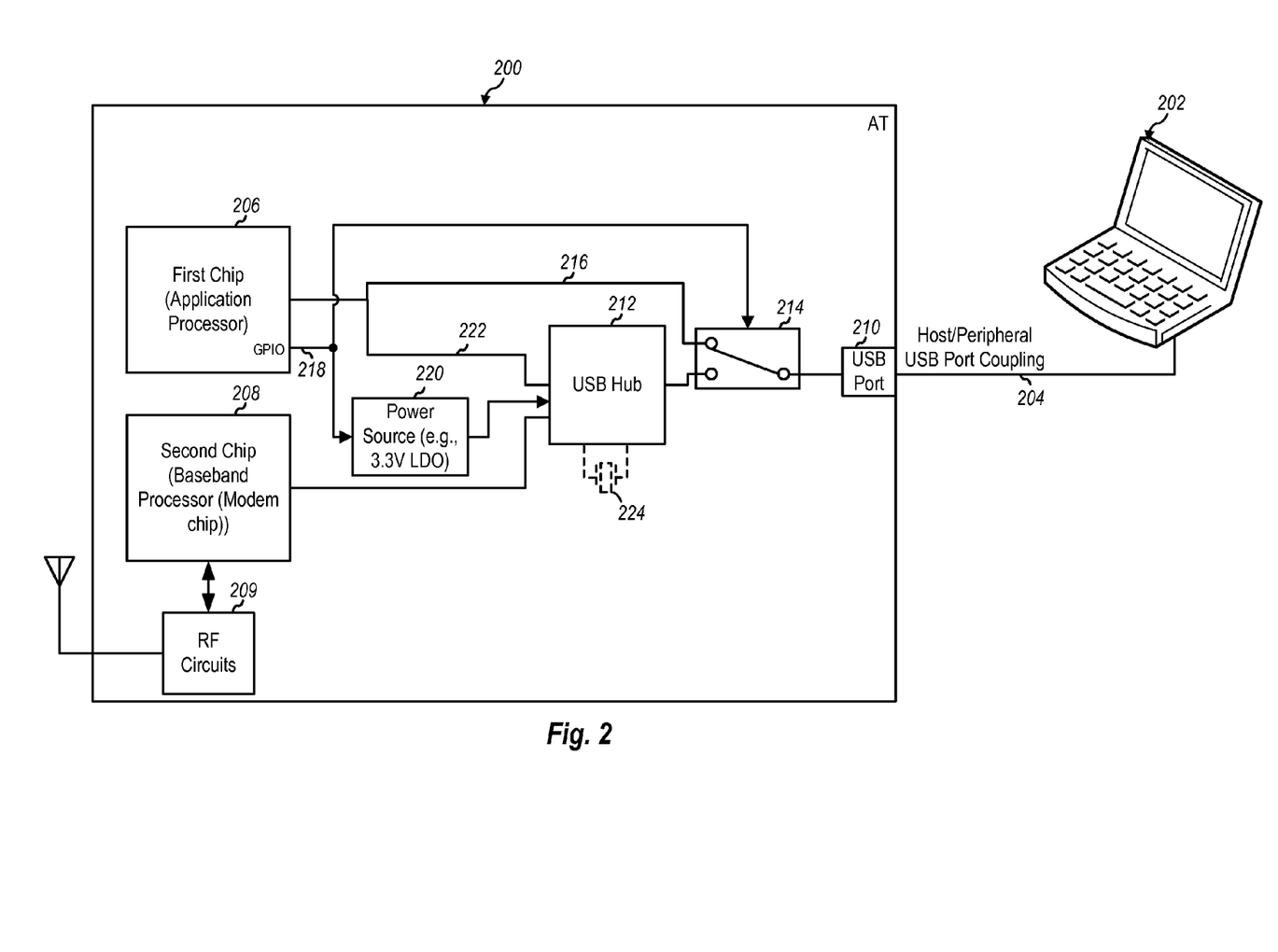
FIG. 2 is a block diagram of a communication device utilizing the presently disclosed methods and apparatus

FIG. 2 illustrates one example of a wireless device 200, such as an access terminal (AT), that is capable of being communicatively coupled to a host such as a PC or other peripheral device 202, as well as also being capable of serving as a host for a peripheral device (not shown) via a USB coupling 204. As shown, device 200 is a multi-processor or multi-chip device including at least two processors or chips. A first processor or chip 206 containing the first processor that may be an Application Processor for running various applications in the wireless device 200. A second processor or chip 208 containing the second processor may be a Baseband (BB) processor (e.g., a modem chip) or similar device for connection to a wireless network, such as an LTE network via RF circuitry 209.

In an aspect, device 200 is a Multi-processor USB device where multiple components therein may communicate or network with external devices (e.g., device 202) via a USB connection. Accordingly, device 200 includes a USB port or connector 210, which may be configured according to any one of a number of different USB connector types (e.g., Micro-AB). Furthermore, device 200 includes a USB hub 212 that routes communications (both upstream and downstream) from multiple components (e.g., processors or chips 206 and 208) to the USB port 210. In the example of FIG. 2, hub 212 is selectively coupled to port 210 through a first switch 214, the operation of which will be discussed later. In an aspect, switch 214 may be implemented with any suitable switching device, such as a high speed switch to accommodate high frequency signaling on the USB bus. As merely one example, switch 214 may be implemented with a USB 2.0 Fairchild FSUSB40 low power, two port, double-pole, double throw (DPDT) switch capable of data rates up to 480 Mbps. The use of DPDT switches in this example afford switching of both the USB data D+ and D− lines from one coupling to another coupling. Other switches are also contemplated that are capable of handing the high frequency signaling desired, whether implemented as an analog switch or other type of switch capable of handling high frequency signaling. Additionally, hub 212 may be implemented by any suitable USB hub, such as a USB 251x hub manufactured by Smart Mixed-Signal Connectivity (SMSC) as merely one example.

In an aspect, USB hub 212 may also be enabled or disabled by being powered on or off under the control of the first processor 206, which may be an Application Processor in one example. In an aspect, powering on and off may be effected using a General Purpose Input Output (GPIO) of processor 206 ceasing (or switching the state of) a "hub enable" signal 218 to shut off a power source 220 (e.g., a 3.3 V low dropout voltage regulator (LDO)). It is also noted that this signal 218 (or an equivalent) may also be concurrently delivered to switch 214 to change the state of the switch 214, which has a default state of connecting port 210 directly to processor 206 via coupling or trace 216. Accordingly, when USB hub 212 is powered on, switch 214 will connect hub 212 to USB port 210 and communication from processor 206 is routed through hub 212 via coupling 222, along with communication from processor 208. Conversely, when the hub 212 is powered off, which is also the default connection, USB port 210 is directly coupled to processor 206, bypassing hub 212.

Thus, in an aspect, when LTE tethered networking is not required, processor 206 (or alternatively some other processor or device such as device 202 could initiate change of modes) USB hub 212 is off and USB port 210 is directly coupled to an application processor 206. In an example, this mode may be the default configuration such that when a device such as device 202 is connected to device 200, the application processor 206 is first connected via the port 210. In this way, processor 206 may then be used to control when hub 212 is operational, and determines control based on knowledge of when other devices, such as processor 208 need to concurrently communicate to a tethered device (e.g., 202) via USB port 210. Additionally, an added benefit of selectively powering hub 212 on is the ability to increase power savings in device 200.

It is noted that in an embodiment, hub 212 may also employ a crystal oscillator 224 or similar device for switching timing. In one example, the crystal 224 may be a 12/20/24 MHz crystal.

Figure 3:
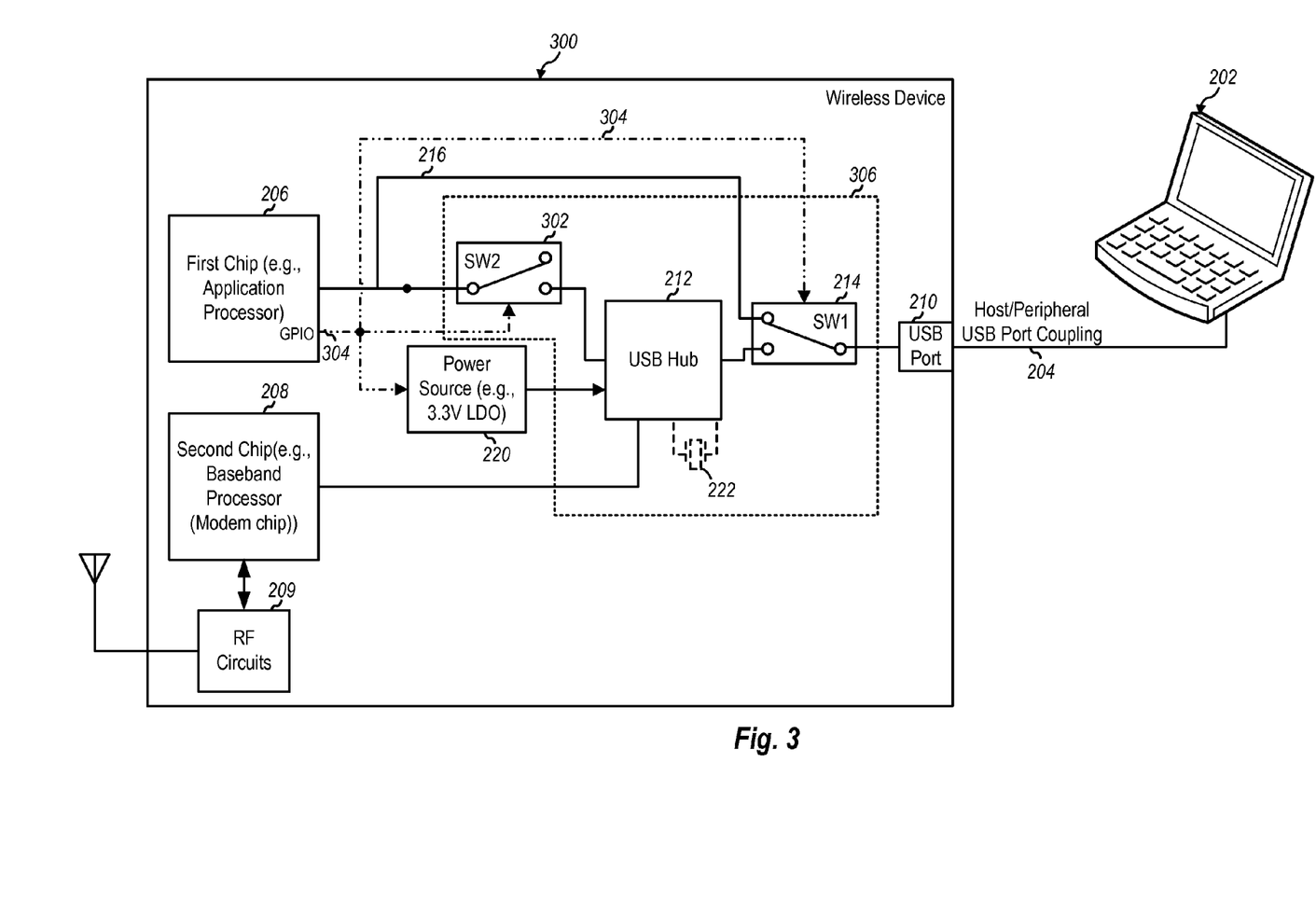
FIG. 3 is a block diagram of another implementation of a communication device utilizing the presently disclosed methods and apparatus.

It is further noted that in the configuration of FIG. 2, it is assumed that switching in hub 212 is capable of tri-stating when the hub 212 is not powered. That is, the processor 206 may be coupled directly to hub 212 via coupling without the need for a switch to connect processor 206 and 212. Nonetheless, in some implementations with particular types of hubs that are not capable of tri-stating the hub's downstream ports when powered off, an alternative implementation may include a further second switch to selectively connect the processor 206 to hub 212. FIG. 3 illustrates another example including such a configured device 300. It is noted that the same elements from FIG. 2 that are shown in FIG. 3 use the same reference numbers.

As illustrated in FIG. 3, a device 300, in addition to the first switch 214, includes a second switch 302 that is coupled between hub 212 and AP 206, in lieu of direct coupling 222 shown in FIG. 2. Accordingly, switch 302 may selectively couple AP 206 to hub 212. In addition to switching power source 220 on and off, a hub enable signal 304 (i.e., the GPIO output signal 218 in FIG. 2) may also be used to operate switch 302 between the default unconnected state as illustrated in FIG. 3 and the alternate state providing connectivity of AP 206 to hub 212 when processor 208 is also using hub 212. In an aspect, it is noted that switches 214 and 302 may be implemented by what are termed "analog switches", such as those manufactured by Fairchild Semiconductor for USB switching as an example. It is noted that in a further aspect, switches may be implemented with either analog circuitry or digital circuitry or a combination thereof It is noted that in an aspect, the coupling or trace 216 directly connecting port 210 and processor or chip 206 may be configured to have a short physical length. For example, in one example the trace 216 may be less than 10 mm in length. A shorter length trace helps, in part, to minimize signal loss occurring in the physical trace.

The presently disclosed configuration also enables LTE modems to be integrated on Smart Phone designs in such a way that can enable LTE data connectivity to the PC over USB in parallel to synchronizing multimedia content over the same USB connector on the phone. This solution can provide full data rates of LTE to the PC without affecting CPU or bus utilization of the main application processor, which can continue running CPU-intensive applications in parallel. For example, a user may watch broadcast movies on the phone while downloading e-mail over to the PC over the LTE network.

In an alternative, it is contemplated that the analog switches 214 and 302 may be incorporated in a single package or chip with the USB hub 212. Thus, FIG. 3, for example, illustrates this alternative package or chip 306 that encompasses or integrate switches 214 and 302 and hub 212 in a common package. In still another alternative, it is noted that all components in package or chip 306 could be integrated with a processor or chip package such as AP 206.

In another aspect, the configuration of FIG. 2 or 3 also benefits factory software programming of a device, such as an LTE phone. In a typical device, factory software programming would be initiated in a BootROM to program a memory such as a NAND Flash Memory (e.g., NAND/eMMC embedded memory) when it is either empty or corrupted. Such programming is performed for the Application Processor (206) and the baseband processor (208) separately via input through the USB port 210 from a host device (e.g., PC 202). Thus, in the configurations of FIG. 2 or 3, AP 206 would be programmed first since it is routed to the USB connector or port 210 by default via at least switch 214 and trace 216. After programming for the AP 206, in an example the AP 206 may periodically check the availability of the baseband (BB) processor or chip 208. If BB processor 208 is not available, this may indicate that BB processor 208 has crashed or that flash memory programming is required. In this case, the AP 206 may turn on the USB hub 212 via GPIO signal 304, and change the analog switch routing to the hub (i.e., at least routing via switch 214 to directly couple the hub 212 to USB port 210). In a further scenario, the AP 206 may enable the hub 212 before initiating flash memory programming This would enable all processors in the system to be flashed concurrently via the hub 212, affording reduced factory programming time. In another specific example, after programming, the USB host 202 will be able to connect to the baseband processor 208 and initiate a software programming or memory dump for the processors 206 and 208 independently.

In still a further aspect, the AP 206 can be configured to enable user-initiated switching to the USB hub 212 in the case of software upgrades. In particular, this function may be implemented as a debug flag in non-volatile memory (i.e., a permanent flag in flash memory) to enable USB hub upon power-up. This may enable the baseband processor 208 to enumerate as a separate diagnostic monitor port on the PC and programming tools can initiate a software update. It is also noted that both the application processor and baseband processors (206, 208) can use diagnostic monitor over USB when USB hub debug flag in non-volatile memory is enabled. In such case, the PC will see two separate USB devices and in some implementations, two serial ports. A PC diagnostic monitoring tool can be attached to either or both serial ports.

In yet a further aspect, the configurations of FIGS. 2 and 3 are useful for improving LTE Tethered Networking. In order to enable LTE Tethered Networking, the AP 206 may be configured to present a User Interface (UI) menu to a user, either at the wireless device 300 or at a connected PC 204, which is used to enable LTE Tethered Networking. Taking the example of FIG. 3, when the LTE Tethered Networking option is selected, AP 206 will enable the USB hub 212 via enable signal 304, and the baseband processor 208 will enumerate as a composite USB device with a dial-up networking or RNDIS (Remote Network Driver Interface Specification) function or any other function capable of transferring IP packets over the USB link. This may be implemented as a persistent configuration potentially using the same persistent debug flag to enable the hub.

When LTE Tethered Networking is not needed, the AP 206 may be configured to turn off the USB hub 212 and program the analog switches 214 and 302 to connect directly to the USB port 210 on the device bypassing the USB hub 212. In an aspect, this can be overridden by a persistent configuration or a debug flag. However, it is noted that keeping LTE Tethered Networking enabled all the time is not recommended because of the extra power consumption on the USB Hub 212. Additionally, keeping LTE Tethered Networking enabled limits USB charging because only Standard Downstream Port (host/hub) charger types will be detected since typical USB hub chips do not support USB charger detection on their upstream facing port. Thus, a USB Wall Charger could not be used when the hub 212 is enabled.

In a further aspect, AP 206 may be configured to enable user content sync to or from its internal or removable memory, including NAND, NOR, eMMC (Embedded Multimedia Card), SD (Secure Digital), SATA (Serial Advanced Technology Attachment) drives, and other types of memories. This may be implemented using USB peripheral mass storage class, UASP (USB Attached SCSI Protocol) class, MTP (Media Transfer Protocol), or MTPz (Microsoft proprietary MTP extensions for Zune) depending on the high level operating system (HLOS) run on the AP 206.

In still another aspect, AP 206 may afford providing GPS fixes over USB from a GPS chip (not shown) using the configurations of FIG. 2 or 3. In particular, AP 306 may enable NMEA (National Marine Electronics Association) over USB to send periodic GPS fixes to the PC host via USB port 210. The NMEA port (not shown) in AP 206 will also be used to initiate GPS test commands from the PC 202. According to some aspects, the baseband processor 208 could be used for GPS-related USB functionality.

Figure 4:
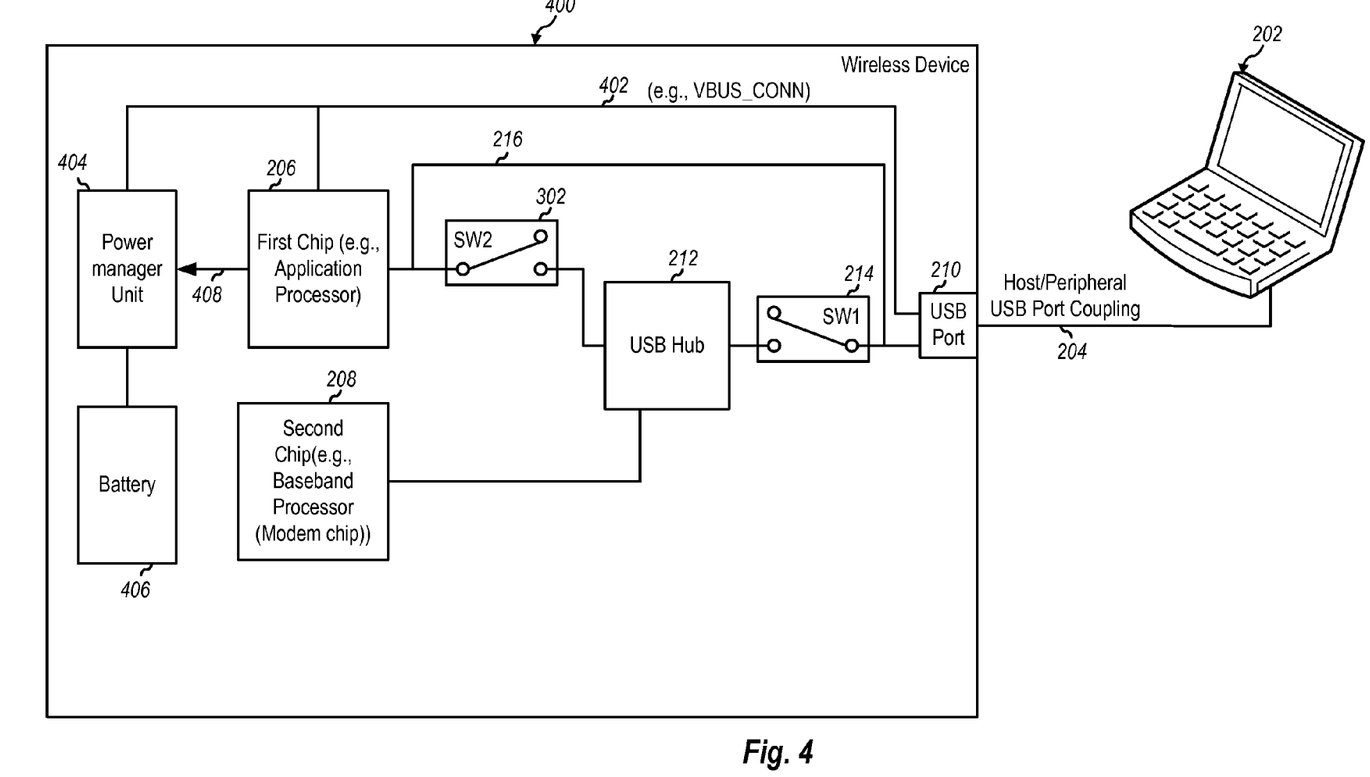
FIG. 4 is a block diagram of still another implementation of a communication device utilizing the presently disclosed methods and apparatus.

In another aspect, the presently disclosed apparatus and methods may also address the issue of USB charging, such as on an integrated platform having a common supply voltage (it is noted that the components shown in devices 200 or 300 in FIG. 2 or 3 may comprise an integrated single platform, or may be implemented separately in part or as a whole as well). In particular, the configurations of FIGS. 2 and 3 have the benefit of enabling USB wall charger detection when a default connection is the direct connection (e.g., trace 216) from port 210 and AP 206. AP 206, in turn, may be configured to implement or control USB charging of a device battery, and may include USB charger type detection and dead battery charging capabilities. For discussion purposes, FIG. 4 illustrates a wireless device 400 that may utilize either the configuration of FIG. 2 or 3 for the USB hub and associated couplings.

As is known in the art, there are multiple types of USB chargers. An example of a first type is a dedicated USB charger, such as a USB wall charger. This first type of charger may typically provide from around 550 mA up to 1.5 A of charging current. Another example of a second type of USB charging is standard downstream USB port charging, where a USB PC (e.g., 204) or USB host provide charging current, which is typically up to 500 mA. Yet another type of charging is a charging downstream port with an enhanced PC or hub that can provide 900 mA or 1.5 A. It is further noted that other types of USB chargers and detection mechanisms can be implemented on the application processor, such as per enhancements defined in USB-IF battery charging specifications. Furthermore, an AP may implement the USB 3.0 specification, which allows devices to draw up to 900 mA from the host for device operation and battery charging.

In each of the above types of charging or chargers, there is a hardware detection mechanism involved in recognizing each type of the USB charger, which is implemented in the USB PHY (physical layer) of the AP 206. Because of the particular configuration of FIGS. 2 and 3, the USB hub 212 may be turned off by default and the USB coupling 216 will route USB signals from the port 210 to the AP 206 directly; and more particularly to the USB PHY in AP 206. Upon a USB cable connection at port 210, AP 206 may be configured to perform charger detection via USB signals (e.g., differential D+ and D− signals) received over coupling 216. In an aspect, a default configuration initially bypassing the USB hub 212 with switch 214 enables a default initial detection of the USB charger type by the application processor 206

As further illustrated, port 210 couples the USB bus voltage (e.g., VBUS_CONN) via a coupling or bus 402 to at least both AP 206 and power management circuitry 404 (e.g., a Qualcomm PMIC) to charge a battery 406. In operation, based on the charger detection performed by AP 206, AP 206, in turn, signals the power manager 404 via coupling 408 to charge the battery 406 according to the detected charger type. It is also noted that since AP 206 is coupled to the USB bus voltage via coupling 402, the processor may be powered even when battery 406 is dead. Furthermore, the configuration of FIGS. 2, 3 and 4 support USB host mode operation, again because a direct connection may be made from port 210 and AP 206. Additionally, the configuration of FIGS. 2, 3 and 4 support USB OTG (On-The-Go) device, which are USB devices that can switch roles from peripheral to host when connected to another USB peripheral device.

Figure 5:
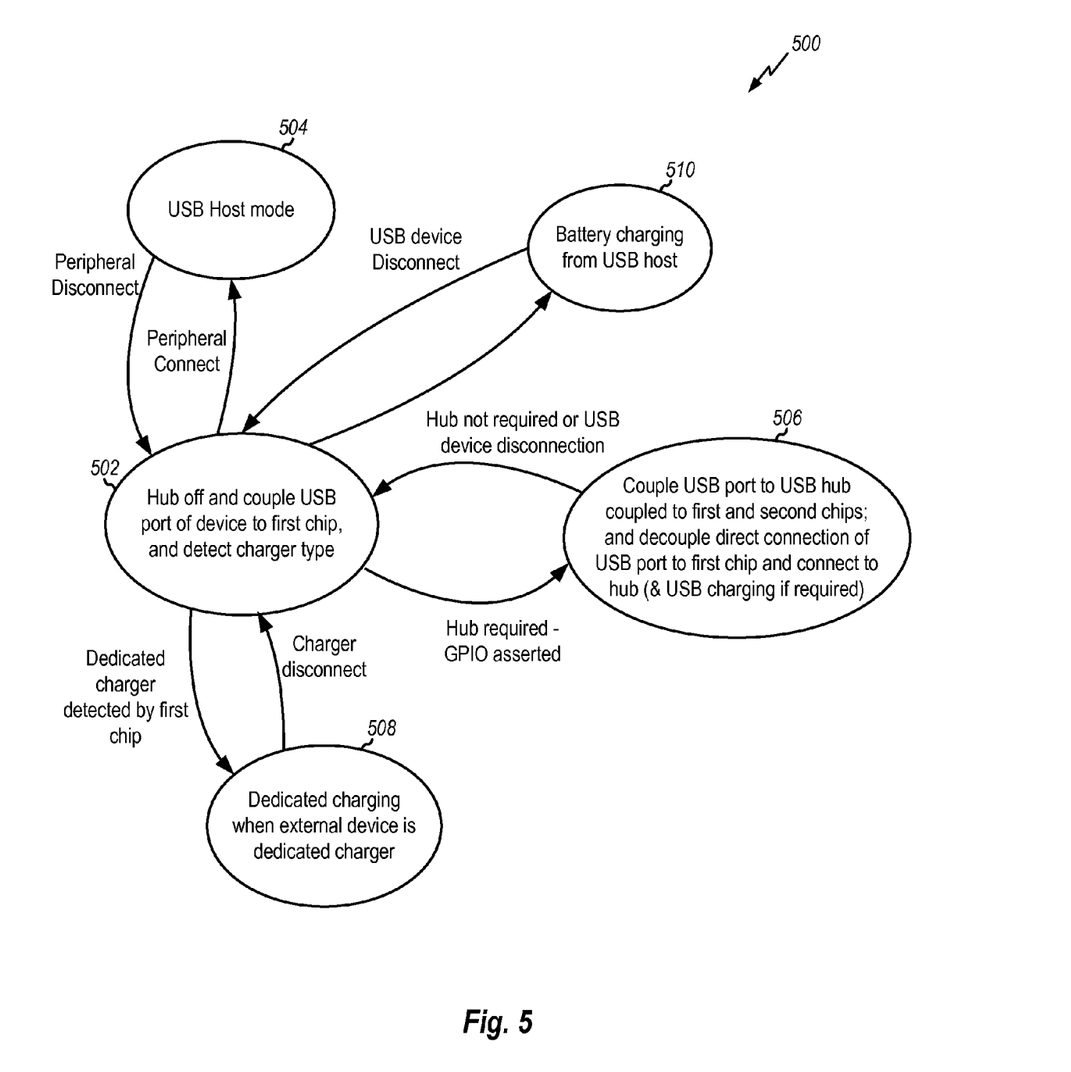
FIG. 5 is state diagram of a method according to the present disclosure.

FIG. 5 is a state diagram 500 illustrating exemplary operation for selective USB connection sharing in a compound USB or multi-processor device, such as 200, 300 or 400 in FIG. 2, 3 or 4. As illustrated, in a first initial state 502 a USB port (e.g., 210) of the device is selectively coupled to a first processor (e.g., 206). As discussed before, in an aspect the default state of switches 214 and 302 engender this coupling in an initial state. When the multi-processor device is in the default state 502, operations may include direct USB signal communications between the first processor (e.g., AP 206) and an external device connection to USB port 210, for example. Additionally, the USB hub (e.g., 212) is turned off as the default allowing direct coupling of the USB port 210 to the first processor (e.g., AP 206) and lower power consumption as the hub is not operational.

As may been seen by state 504, the multi-processor device may be configured to enter a USB host mode from state 502 where a peripheral device, such as a USB keyboard, thumb drive, external USB hub, etc., may be coupled to the USB port 210 whereupon the device becomes a host to the peripheral (s). The detection of a peripheral device may be performed by the AP 206 in either of states 502 or 504, for example, through detecting when an ID-pin on the USB connector is grounded. The device may return to the state 502 when the peripheral device is disconnected, which is detected when the ID-pin is no longer grounded (i.e., is a floating voltage), as one example. It is noted that this capability affords lower power usage in the device since the hub 212 is maintained in a power off state.

Another operation that may be performed while the device is in state 502 may include determining with the first processor a charger type or port that may be effected through connection of a USB device to port 210. This operation may include determining a dedicated charger (e.g., a "Dedicated charging port" in USB terminology or similar functional equivalent) or charging from a standard downstream USB port, such as when a PC or similar host device is connected to the USB port, or via the USB hub (termed also herein as "host/hub" to denote both possibilities). The standard downstream USB port charging may be termed as a "Standard Downstream Port" per the USB battery charging specification or considered as a USB host/hub device charger. Additionally, other USB charging that may be detected is USB enhanced host device charging, otherwise known as a "Charging Downstream Port" and may be either from an enhanced host/hub device. Furthermore, other operations in state 502 might include software programming of the first processor and/or associated memory, as well as subsequent programming of a second processor.

According to an aspect, during operation in state 502 the first processor may monitor the need for tethered networking, such as LTE Tethered Networking, which would require that the USB hub be turned on to allow connectivity of at least the second processor, such as baseband processor 208. In another aspect, the first processor may be configured to present a user interface (UI) menu to a user of the device to allow enablement of tethered networking, When this option is selected, the first processor will enable the USB Hub and the second processor (e.g., baseband processor 208) will enumerate as a stand-alone or a composite USB device with a USB function enabling IP (Internet Protocol) communication over USB, including the Class Definition for Communication Devices/Abstract Control Model (CDC/ACM), the Class Definition for Communication Devices/Ethernet Control Model (CDC/ECM), the Class Definition for Communication Devices/Network Control Model (CDC/NCM), the Class Definition for Communication Devices/Ethernet Emulation Model (CDC/EEM) or the Remote Network_Driver_interface_Specification (RNDIS), although other types of interfaces could also be used.

Additionally, the multi-processor device may also be enabled by a PC host by sending a vendor-specific command to the first processor (e.g., AP 206) over USB, such as with a QMI (Qualcomm Messaging Interface) command in one example. Furthermore, this particular enabling by the PC host may be implemented as a persistent configuration potentially using the same persistent debug flag to enable the hub.

When tethered networking is required or requested, the first processor may issue a signal, such as GPIO 218 or 304, to cause the device to enter state 506 wherein the USB port (e.g., 210) is selectively coupled to the USB hub (e.g., 212) due to operation of at least a first switch (e.g., 214) and alternatively a second switch (e.g., 302), which also effects coupling of the first processor to the USB hub. Additionally, the USB hub is enabled thereby allowing at least the second processor (e.g., baseband processor 208) coupled to the hub to selectively be coupled to the USB port. When tethered networking is no longer desired at state 506, the first processor may also initiate return to default state 502 by de-asserting or ceasing the GPIO signal, as one example of how to effect the state change. The operations performed in state 506 may also include USB host battery charging of either standard or enhanced hub/host operations as discussed previously.

Further, when battery charger type detection occurs at state 502, divergent states may result dependent on the charger type detected. For example, if the detected charger is a dedicated charger, the device may move to and remain at state 508 where a dedicated battery charging is performed as the dedicated battery charger requires no USB tethered communication. Return to state 502 would then occur when the dedicated charger is disconnected as illustrated in FIG. 5.

Alternatively, when a standard USB charger is detected, such as charging from a

PC host or an enhanced PC charging port, the first processor may direct a power management circuit (e.g., 404) to perform battery charging according to that charger type as illustrated by transition to state 510 showing battery charging from a USB host (or hub). In an alternative, battery charging may also be performed either via a direct USB $V_{BUS}$ connection as illustrated by FIG. 4, or through the USB hub 212. Although FIG. 5 illustrates that state 510 is a separate state, the battery charging performed therein may occur continuously regardless of whether the device is operating in state 502 or state 510. In this manner, the battery charging of state 510 may operate independently of and/or concurrent with the operations of the device when in state 502 or state 506.

Of further note, in an aspect FIG. 5 illustrates whenever a device connected to the USB port (210) is disconnected, whether the device be a dedicated charger, USB peripheral device, USB host charging port, or USB external device effected tethered networking, the state of the device will revert to default state 502. This is beneficial in that the default state ensures direct connection of the port 210 to the AP 206, as well as a powered down state for USB hub 212, which results in lower power consumption for the device.

Figure 6:
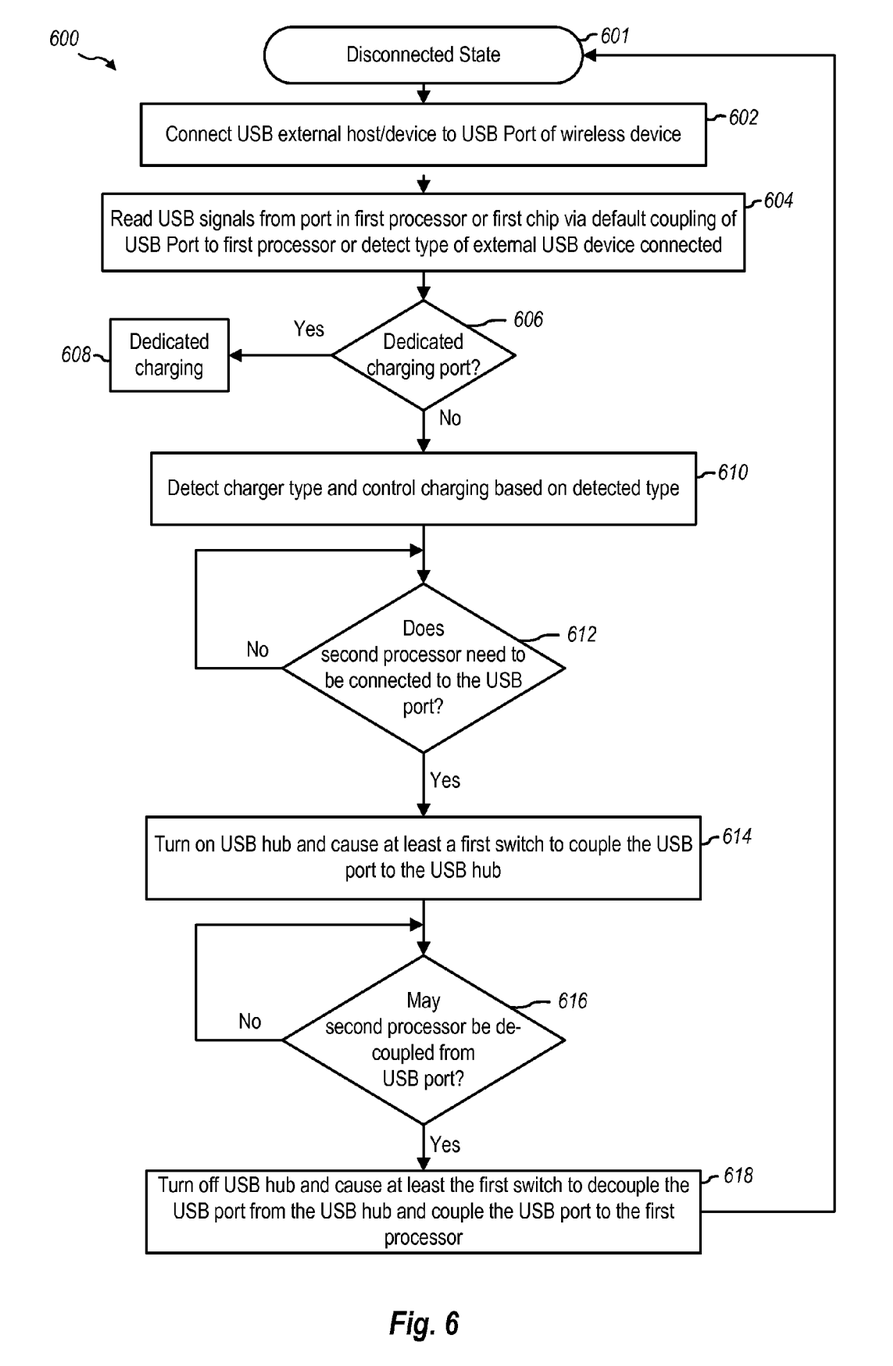
FIG. 6 illustrates a flow diagram of an exemplary method for selectively coupling USB connections in a multi-processor device.

FIG. 6 illustrates a flow diagram of an exemplary method 600 for selectively coupling USB connections in a compound USB or multi-processor device. Method 600 begins with block 601, which is a default disconnected status where no USB connection is made with a USB port of the multi-processor device (e.g., port 210). In an example, block 601 may be representative of state 502 in FIG. 5 where default connection of the AP 206 with the USB hub 210 is present, and the USB hub 212 is not powered up, thus lowering power consumption.

After block 601, flow may proceed to block 602 where an external USB device or USBhost device is connected to a USB port of a device, such as a wireless device or smartphone. After connection of the external device/host device to the USB port, flow proceeds to block 604 where USB signals are fed from the USB port to a first processor or first chip containing the first processor. In particular, the process 604 is based on a default coupling of the USB port to the first processor or first chip containing the first processor. For example, the configurations of FIG. 2 or 3, as discussed above, illustrate the default coupling of hub 210 with the application processor or chip containing the processor 206. This coupling is via trace 216 in one example. Additionally, the processes of block 604 may include detecting a type of external USB peripheral device that may be connected to port 210 in a USB host mode. For example, the device (e.g., smart phone) may serve as a USB host to USB devices such as a USB thumb drive, keyboard or audio headset. The detection may be performed by the AP 206, for example, through detecting when the ID-pin on the USB connector is grounded. Although not shown in FIG. 6, the device may then return to the initial state (block 601) if device disconnection is detected and the ID-pin is no longer grounded (i.e., floating).

After the signals have been read by the first processor, flow proceeds to decision block 606 where method 600 determines whether the USB signals are indicative of a dedicated charger being connected to the USB port. If a dedicated charger has been connected, flow proceeds to block 608 where dedicated charging is performed and no further processes are executed until a USB dedicated charger is disconnected. Alternatively, if no dedicated charger is connected, flow proceeds to block 610 where again other charger types (e.g., USB host device charging) may be detected and control of the charging is based on the detected type. For example, the charger type may be a USB host device, such as a PC or an enhanced PC.

It is further noted here that the detection of chargers in blocks 606 and 610 is merely optional for method 600 and that, in an aspect, method 600 may only comprise the remaining processes of blocks 612 through 618, discussed below.

At decision block 612, the first processor or chip such as an application processor 206 periodically monitors and determines if a second processor, such as a baseband processor (e.g., 208) is required to be coupled to the USB port. If not, flow continues to loop back to block 612 thereby maintaining the default configuration where the USB port is connected directly to the first processor and the USB hub remains off An example of this state is state 502 shown previously in the state diagram of FIG. 5.

When the first processor (e.g., 206) determines that at least a second processor is required for tethered networking in decision block 612, flow proceeds to block 614 where the first processor, for example, turns on the USB hub and causes at least a first switch to couple the USB port directly to the USB hub. For example, this process it may be affected by issuance of the GPIO signal 218 or 304 to power source 220 as well as switching first switch to 14, as well as switch 302 in the example of FIG. 3. Accordingly, the resultant connections include port 210 connected to hub 212 and the first and second processors or chips containing the processors 206, 208 are communicatively coupled with USB hub 212 to enable communication by these devices with the port 210 and ultimately a host or peripheral device such as PC 202.

The resultant state of the processes of block 614 may be state 508 illustrated in FIG. 5, as one example. After the USB hub and switches have been operated, flow proceeds to decision block 616 where a determination may be made whether the second processor may be decoupled from the USB port. The determination in block 616 may be implemented or carried out by the application processor 206 and performed in a periodic manner to continue to check if the second processor is needed for tethered networking. As long as tethered networking is required, flow loops back to block 616 with the USB hub active or enabled until such time that tethered networking is no longer desired. It is noted that the checking processes of block 616 may be effected by an application processor 206, but also could be implemented with input from processor 208 or another processor as well.

Once a determination is made that the second processor is no longer needed for tethered networking, flow proceeds from block 616 to block 618 where the application processor 206 initiates turning off the USB hub such as via asserting the GPIO output or a similar mechanism for performing this function. Additionally, the at least first switch (e.g., 214) switches state causing the USB port 210 to be decoupled from the USB hub and return of a direct coupling of the USB port 210 to the first processor or chip containing the first processor (e.g., AP 206). As an example, this operation or processes in block 618 may be seen by a change from state 506 back to state 502 as illustrated in FIG. 5.

In an aspect of USB operation in an exemplary device, when a USB hub such as hub 212 is turned off, a temporary disconnection of the application processor from USB port 210 may result. Accordingly, the port 210 is connected to a PC host, for example, the application processor 206 would detect a connection again (via trace 216) and reconnect. Accordingly, although not shown in the example of FIG. 6, it is also noted that in an aspect transition from block 616 to block 618 may also be conditioned in block 616 upon a determination whether or not the first processor is actively using the USB connection. If the first processor is actively using the USB connection, the device may then proceed to block 618 only when the first processor is not actively using the USB connection. Otherwise, the first processor might see a sudden removal from the USB connection, which could potentially cause failures or errors.

After block 618, flow may then proceed back to default disconnected state shown by block 601. This flow may occur when a determination is made that a USB host (e.g., a PC) or connection no longer exists at the port 210. In an alternative that is not shown, flow may proceed from block 618 back to block 612 in the case where the hub may be turned off, but a USB host or other USB connection still exists at the port 210 and further operation may once again require that the hub 212 where the application processor once again monitors the system of the wireless device for instances when tethered networking and coupling of at least the second processor or chip is once again required.

Figure 7:
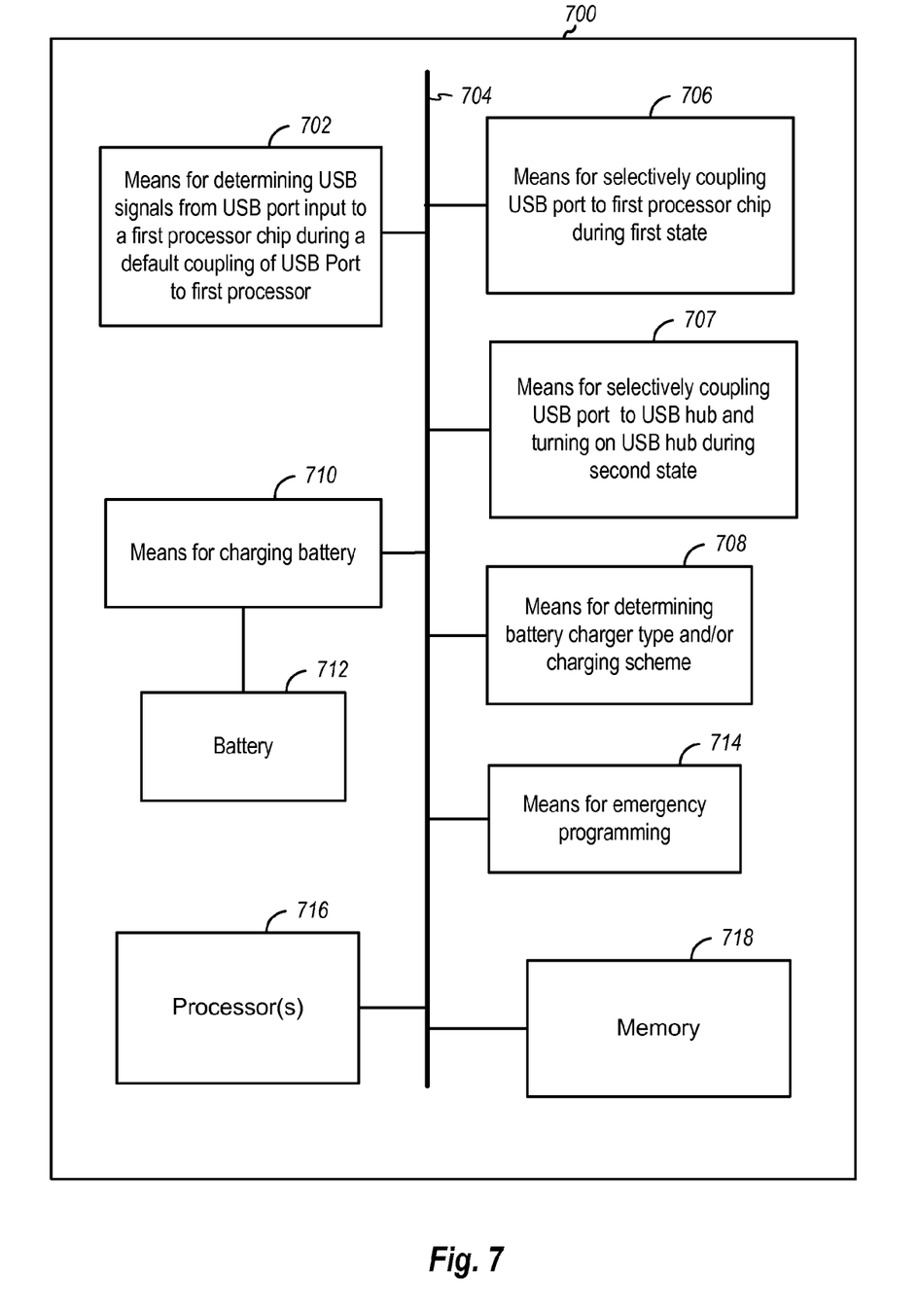
FIG. 7 illustrates another apparatus for selectively coupling USB connections in a multi-processor device that effects tethered networking for a wireless device.

FIG. 7 illustrates another apparatus 700 for selectively coupling USB connections in a multi-processor device that effects tethered networking for a wireless device, for example, via a USB connection with a host or a peripheral device. Apparatus 700 includes a means 702 for determining USB signals received from a USB port in a device such as a wireless device or smartphone. Furthermore, means 702 utilizes a first processor chip to determine the USB signals during a default coupling of the USB for to the first processor. As an example of means 702 implementation, a processor 206 or at least a portion thereof, as well as at least switch 214 and trace 216 to couple the USB port to the first processor illustrated in FIG. 2 or 3 may be one implementation.

Apparatus 700 also includes a communication bus 704 or similar apparatus for affecting communication between various means or modules of apparatus 700. As illustrated, apparatus 700 includes means 706 for selectively coupling the USB port to the first processor chip during a first state, such as state 502 shown in FIG. 5. Further, apparatus 700 also includes means 707 for selectively coupling the USB hub directly to the USB port and turning on the USB hub coupled to the first processor chip (selectively so in the case of FIG. 3) and at least a second processor or chip containing the second processor, thereby enabling coupling of the second processor to the USB port through the USB hub. An example of one implementation of means 706 and 707 includes switch 214 and power source 220 under the control of the GPIO output signal 218 or 304. Is noted that such implementation is not limiting for means 706 and 707, and that one skilled in the art will recognize that equivalent means are possible such as signaling directly to a USB hub rather than controlling a power source of the hub or instead of analog switching as illustrated in FIGS. 2 and 3, high speed digital switching may be implemented as well. Furthermore, means 706 and 707 may include a processor, such as processor AP 206 that determines when tethered networking is required and causes the USB hub to be turned on or off as well as causing switching couplings between a USB port and either to a first processor chip or directly to the USB hub.

Furthermore, apparatus 700 and may include in an alternative a means 708 for determining a battery charger type or battery charging scheme for a mobile wireless device, for example, in which apparatus 700 may be utilized. Means 708 may be implemented by, but not limited to, the application processor 206 as well as the $V_{BUS}$ connection from port 210 to the application processor 206 as illustrated by trace 402 in FIG. 4. Complementary with means 708, is means 710 for charging the battery of the mobile or wireless device which apparatus 700 is used. As an example, means 710 may be implemented by a power management or power control unit such as power management unit 404 illustrated in FIG. 4 or any equivalent device for accomplishing a power management function. Although not shown, the voltage source for charging a battery 712 is connected to means 710, which then is used to charge the battery 712 according to the type of battery charging determined by means 708.

In an aspect, apparatus 700 may also include a means for emergency programming 714. As an example, this emergency programming may be affected by the application processor six and, more specifically, by the default coupling of the USB port 210 to the application processor 206 thereby enabling programming by a peripheral or host device such as PC 202.

Additionally, apparatus 700 may include one or more processors 716, which may be implemented by one or more of an application processor 206 a baseband processor 208, a digital signal processor, a general processor, or any combination thereof. Additionally, a memory 718 to be included for storing computer implementable instructions or code that is executable by the processor or processors 216 for carrying out or controlling one or more of the processes implemented by the various means of apparatus 700.

In light of the foregoing, the present disclosure enables LTE modems to be integrated on Smart Phone designs in such a way that can enable LTE data connectivity to the PC over USB in parallel to synchronizing multimedia content over the same USB connector on the phone. This solution can provide full data rates of LTE to the PC without affecting CPU or bus utilization of the main application processor, which can continue running CPU-intensive applications in parallel. This can include watching broadcast movies on the phone while downloading e-mail over to the PC over the LTE network. The analog switch design is one solution to enable power-efficient operation. In addition, the present apparatus and methods address the issue of USB charging on such an integrated platform. Bypassing the USB hub enables detection of multiple USB charger types and allows higher charging currents (i.e., 1.5 A or higher dependent on USB battery charging specifications) and therefore faster charging time. Additional advantages may be realized with integration of USB 3.0 on the primary processor and/or each of the secondary processors that will enable even higher data rates over the USB bus. In this case, the disclosed system may integrate a USB 3.0 capable hub.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill will further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The word "exemplary" is used herein to mean "serving as an example, instance, or illustration." Any example described herein as "exemplary" is not necessarily to be construed as preferred or advantageous over other examples.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A multi-processor or multi-chip device for selectively sharing a USB connection based upon whether or not concurrent tethered high-speed network access networking and USB data transfer is occurring in the device, comprising:

a first processor;

a USB hub operable to route a plurality of USB connections;

a second processor coupled to the USB hub;

at least a first switch coupled to a USB port of the device and configured to selectively couple the USB port to one of the first processor or to the USB hub; and wherein the first processor is configured to selectively share a USB connection based upon whether concurrent tethered high-speed network access networking and USB data transfer is occurring between an access terminal in said device communicatively connected to a peripheral device via said USB connections to enable or disable the USB hub; and wherein the first processor is configured to be emergency programmed when the USB port is coupled to the first processor via the first switch in a default configuration and subsequently selectively turns on the USB hub to enable emergency programming of the second processor via the USB port and USB hub.

2. The device as defined in claim 1, wherein a default state of the device includes at least the first switch coupling the USB port to the first processor and the USB hub disabled.

3. The device as defined in claim 1, wherein the first processor is configured to control the first switch.

4. The device as defined in claim 1, further comprising a USB hub power source, wherein the first processor is configured to selectively enable or disable the USB hub by switching the USB hub power source on and off, respectively.

5. The device as defined in claim 1, further comprising:

a second switch coupled to at least the USB hub and the first processor, wherein the second switch is configured to concurrently operate with the first switch and selectively couple the first processor to the USB hub.

6. The device as defined in claim 5, wherein the second switch is controlled by the first processor.

7. The device as defined in claim 5, wherein at least one of the first and second switches are integrated with the USB hub in a common package.

8. The device as defined in claim 1, further comprising:

a power manager unit configured to charge a battery powering the device; and wherein the first processor is further configured to:

detect a type of USB battery charger connected to the USB port that supplies power to the power manager unit; and signal the power manager unit to charge the battery based on the type of USB charger detected.

9. The device as defined in claim 8, wherein the types of USB battery charger include one of a dedicated charger, a USB host/hub device charger, and a USB enhanced host/hub device charger.

10. The device as defined in claim 1, wherein the device further comprises a wireless communication device capable of wireless tethered networking to a wireless network via the second processor.

11. The device as defined in claim 10, wherein the wireless communication device is configured to operate in a Long Term Evolution (LTE) wireless network.

12. The device as defined in claim 1, wherein the first processor comprises an Application Processor and the second processor comprises a Baseband Processor.

13. A method for communicatively coupling components in a multi-processor USB device, to selectively share a USB connection based upon whether concurrent tethered high-speed network access networking and USB data transfer is occurring in the device, the method comprising:

selectively coupling a USB port of the device to a first processor during a first state; and selectively coupling the USB port to a USB hub coupled to the first processor and at least a second processor during a second state thereby enabling coupling of the second processor to the USB port through the USB hub;

wherein selectively coupling the USB port to the first processor in the first state and to the USB hub to the USB port in the second state comprises controlling at least a first switch to couple the USB port between either the first processor or the USB hub; and wherein the first processor is configured to be emergency programmed when the USB port is coupled to the first processor via the first switch in a default configuration and subsequently selectively turns on the USB hub to enable emergency programming of the second processor via the USB port and USB hub.

14. The method as defined in claim 13, wherein the first state is a default state of the device including coupling of the USB port to the first processor and the USB hub disabled.

15. The method as defined in claim 13, further comprising selectively enabling or disabling the USB hub for switching between the first and second states.

16. The method as defined in claim 13, wherein selectively coupling the USB port to the first processor in the first state and to the USB hub in the second state further comprises:

controlling a second switch coupled between the USB hub and the first processor to selectively couple the first processor and the USB hub, wherein the control of the second switch is configured to concurrently operate the second switch with the first switch.

17. The method as defined in claim 13, further comprising:

detecting a type of USB battery charger connected to the USB port that supplies power to the device for battery charging; and charging the battery based on the type of USB charger detected.

18. The method as defined in claim 17, wherein the types of USB battery charger include one of a dedicated charger, a USB host/hub device charger, and a USB enhanced host/hub device charger.

19. The method as defined in claim 13, further comprising emergency programming the first processor during the first state from a peripheral device connected the USB port prior to operation of the device.

20. The method as defined in claim 13, further comprising:

wirelessly networking with a wireless network via the second processor;

performing tethered networking with the wireless network for a USB host connected to the USB port using the second processor and USB hub when the device is in the second state.

21. The method as defined in claim 20, wherein the device is configured to operate in a Long Term Evolution (LTE) wireless network.

22. The method as defined in claim 13, wherein the first processor comprises an Application Processor and the second processor comprises a Baseband Processor.

23. An apparatus for communicatively coupling component: in a multi-processor USB device to selectively share a USB connection based upon whether or not concurrent tethered high-speed network access networking and USB data transfer is occurring in the device, the apparatus comprising:

means for selectively coupling a USB port of the device to a first processor during a first state;

means for selectively coupling the USB port to a USB hub coupled to the first processor and at least a second processor during a second state thereby enabling coupling of the second processor to the USB port through the USB hub; further comprising means for selectively enabling or disabling the USB hub for switching between the first and second states;

wherein the means for selectively coupling the USB port to the first processor in the first state and means for selectively coupling the USB hub to USB port in the second state include means for controlling at least a first switch to couple the USB port to one of the first processor and the USB hub; and means for emergency programming the first processor when the USB port is coupled to the first processor via the first switch in a default configuration and subsequently selectively turns on the USB hub to enable emergency programming of the second processor via the USB port and USB hub.

24. The apparatus as defined in claim 23, wherein the first state is a default state of the device including coupling of the USB port to the first processor and the USB hub disabled.

25. The apparatus as defined in claim 23, wherein the means for selectively coupling the USB port to the first processor in the first state and means for selectively coupling the USB hub to the USB port in the second state further comprise:

means for controlling a second switch coupled between the USB hub and the first processor to selectively couple the first processor and the USB hub, wherein the control of the second switch is configured to concurrently operate the second switch with the first switch.

26. The apparatus as defined in claim 23, further comprising:

means for detecting a type of USB battery charger connected to the USB port that supplies power to the device for battery charging; and means for charging the battery based on the type of USB charger detected.

27. The apparatus as defined in claim 26, wherein the types of USB battery charger include one of a dedicated charger, a USB host/hub device charger, and a USB enhanced host/hub device charger.

28. The apparatus as defined in claim 23, further comprising means for emergency programming the first processor during the first state from a peripheral device connected the USB port prior to operation of the device.

29. The apparatus as defined in claim 23, further comprising:

means for wirelessly networking with a wireless network via the second processor;

means for performing tethered networking with the wireless network for a USB host connected to the USB port using the second processor and USB hub when the device is in the second state.

30. The apparatus as defined in claim 23, wherein the device is configured to operate in a Long Term Evolution (LTE) wireless network.

31. The apparatus as defined in claim 23, wherein the first processor comprises an Application Processor and the second processor comprises a Baseband Processor.

32. A computer program product for selectively haring a USB connection based upon whether or not concurrent tethered high-speed networks access, networking and USB data transfer is occurring in the device, comprising:

a non transitory computer-readable storage medium comprising:

code for causing a computer to control selective coupling of a USB port of a multi-processor USB device to a first processor in the device during a first state; and code for causing a computer to control selective coupling of the USB port to a USB hub coupled to the first processor and at least a second processor during a second state thereby enabling coupling of the second processor to the USB port through the USB hub;

further comprising code for causing a computer to control selective enabling or disabling of the USB hub for switching between the first and second states;

wherein the code for controlling selective coupling of the USB port to the first processor in the first state and selective coupling of the USB hub to USB port in the second state include code for causing a computer to control at least a first switch to couple the USB port to one of the first processor and the USB hub; and code for causing a computer to emergency program the first processor when the USB port is coupled to the first processor via the first switch in a default configuration and subsequently selectively turns on the USB hub to enable emergency programming of the second processor via the USB port and USB hub.

33. The computer program product as defined in claim 32, wherein the first state is a default state of the device including coupling of the USB port to the first processor and the USB hub disabled.

34. The computer program product as defined in claim 32, wherein the code for controlling selective coupling of the USB port to the first processor in the first state and selective coupling of the USB hub to USB port in the second state include code for causing a computer to control a second switch coupled between the USB hub and the first processor to selectively couple the first processor and the USB hub, wherein the control of the second switch is configured to concurrently operate the second switch with the first switch.

35. The computer program product as defined in claim 32, the computer-readable medium further comprising:

code for causing a computer to detect a type of USB battery charger connected to the USB port that supplies power to the device for battery charging; and code for causing a computer to control a power manager charging the battery based on the type of USB charger detected.

36. The computer program product as defined in claim 35, wherein the types of USB battery charger include one of a dedicated charger, a USB host/hub device charger, and a USB enhanced host/hub device charger.

37. The computer program product as defined in claim 32, the computer-readable medium further comprising:

code for causing a computer to control wireless networking with a wireless network using the second processor;

code for causing a computer to control tethered networking with the wireless network for a USB host connected to the USB port using the second processor and USB hub when the device is in the second state.

38. The computer program product as defined in claim 32, wherein the device is configured to operate in a Long Term Evolution (LTE) wireless network.

39. The computer program product as defined in claim 32, wherein the first processor comprises an Application Processor and the second processor comprises a Baseband Processor.

* * * * *